US010306693B2

(12) United States Patent
Tang et al.

(10) Patent No.: US 10,306,693 B2
(45) Date of Patent: May 28, 2019

(54) SERVICE COMMUNICATION METHOD, TERMINAL AND NETWORK DEVICE

(71) Applicant: GUANGDONG OPPO MOBILE TELECOMMUNICATIONS CORP., LTD., Dongguan, Guangdong (CN)

(72) Inventors: Hai Tang, Dongguan (CN); Yuanqing Zeng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/571,411

(22) PCT Filed: May 17, 2016

(86) PCT No.: PCT/CN2016/082382
§ 371 (c)(1),
(2) Date: Nov. 2, 2017

(87) PCT Pub. No.: WO2017/008573
PCT Pub. Date: Jan. 19, 2017

(65) Prior Publication Data
US 2018/0295664 A1 Oct. 11, 2018

(30) Foreign Application Priority Data
Jul. 14, 2015 (CN) .......................... 2015 1 0413529

(51) Int. Cl.
*H04W 76/16* (2018.01)
*H04W 48/18* (2009.01)
(Continued)

(52) U.S. Cl.
CPC ........... *H04W 76/16* (2018.02); *H04W 48/10* (2013.01); *H04W 48/18* (2013.01); *H04W 88/06* (2013.01)

(58) Field of Classification Search
CPC ... H04W 36/22; H04W 88/06; Y02D 70/1224
(Continued)

(56) References Cited

U.S. PATENT DOCUMENTS

2008/0045262 A1  2/2008  Phan
2008/0125126 A1  5/2008  Fang
(Continued)

FOREIGN PATENT DOCUMENTS

CN   101193448 A   6/2008
CN   101378360 A   3/2009
(Continued)

OTHER PUBLICATIONS

International Search Report (ISR) and Written Opinion (WO) dated Jul. 26, 2016 for International Application No. PCT/CN2016/082382.
(Continued)

*Primary Examiner* — Kiet M Doan
(74) *Attorney, Agent, or Firm* — Ladas & Parry LLP; Loren K. Thompson

(57) ABSTRACT

Embodiments provide a service communication method. The method uses multiple Radio Access Technologies (RATs), and includes that: a terminal receives network capabilities of the multiple RATs; the terminal selects at least two RATs for a service of the terminal from the multiple RATs according to the network capabilities; and the terminal performs communication of the service by using the at least two RATs. In the embodiments, the terminal selects the at least two RATs for the service, so that manual setting of a user can be avoided, and thereby performance and convenience of the multiple RATs can be improved.

18 Claims, 8 Drawing Sheets

(51) Int. Cl.
*H04W 48/10* (2009.01)
*H04W 88/06* (2009.01)

(58) Field of Classification Search
USPC .............. 370/329, 278, 228, 328; 455/432.1,
455/435.3, 450, 434, 67.11, 553.1
See application file for complete search history.

(56) References Cited

U.S. PATENT DOCUMENTS

| | | | |
|---|---|---|---|
| 2008/0233955 A1* | 9/2008 | Narang | H04W 48/16 |
| | | | 455/434 |
| 2010/0216468 A1* | 8/2010 | Kazmi | H04W 48/20 |
| | | | 455/435.3 |
| 2011/0319072 A1 | 12/2011 | Ekici | |
| 2012/0140743 A1 | 6/2012 | Pelletier | |
| 2012/0149376 A1 | 6/2012 | Fang | |
| 2012/0282926 A1 | 11/2012 | Zappulla | |
| 2013/0012201 A1 | 1/2013 | Zappulla | |
| 2013/0150026 A1 | 6/2013 | Ekici et al. | |
| 2014/0254498 A1* | 9/2014 | Mueck | H04W 72/02 |
| | | | 370/329 |
| 2015/0188680 A1 | 7/2015 | Li et al. | |
| 2016/0066364 A1 | 3/2016 | Marinier et al. | |
| 2016/0255563 A1* | 9/2016 | Callender | H04W 48/16 |
| | | | 455/437 |
| 2016/0277974 A1 | 9/2016 | Persson et al. | |

FOREIGN PATENT DOCUMENTS

| | | |
|---|---|---|
| CN | 102378358 A | 3/2012 |
| CN | 102823284 A | 12/2012 |
| CN | 102833724 A | 12/2012 |
| CN | 103238368 A | 8/2013 |
| CN | 104581854 A | 4/2015 |
| WO | 2014/060544 A1 | 4/2014 |
| WO | 2014148969 A1 | 9/2014 |

OTHER PUBLICATIONS

Espacenet English abstract of CN 102823284 A.
Espacenet English abstract of CN 101193448 A.
Espacenet English abstract of CN 103238368 A.
English Translation of the Written Opinion of the International Search Authority in international application No. PCT/CN2016/082382, dated Jul. 26, 2016.
Supplementary European Search Report in European application No. 16823720.4, dated Apr. 4, 2018.
Alcatel-Lucent: "Policy based terminal triggered, ANDSF decided access selection", 3GPP Draft; S2-081658_Revision of 1355 ANDSF Discussion V2, 3rd Generation Partnership Project (3GPP), Mobile Competence Centre; 650, Route des Lucioles, F-06921 Sophia-Antipolis Cedex; France, vol. SA WG2, No. Athens; Feb. 16, 2008 , Feb. 16, 2008 (Feb. 16, 2008), XP050263998.

* cited by examiner

SERVICE COMMUNICATION METHOD, TERMINAL AND NETWORK DEVICE

RELATED APPLICATION

This application is an application under 35 U.S.C. 371 of International Application No. PCT/CN2016/082382 filed on May 17, 2016, the entire contents of which are incorporated herein by reference.

The disclosure claims priority to Chinese Application No. 201510413529.0, filed on Jul. 14, 2015 and entitled "service communication method, terminal and network device", the contents of which are hereby incorporated by reference in its entirety.

TECHNICAL FIELD

Embodiments of the disclosure relate to the field of communications, and more particularly to a service communication method, a terminal and a network device.

BACKGROUND

The next-generation mobile communication system (commonly known as 5th-Generation (5G)) may further improve quality of services. Besides a conventional requirement on increase of data rate and the like, ensuring continuity of service and meeting quality requirements of different services in various environments become important requirements of evolution to a user-centric network. Requirements of services which can be provided by the next-generation mobile communication system are ever-changing, and it is difficult for a single wireless technology to meet all the requirements on the premise of reasonable cost, so that an organic combination of different wireless technologies becomes a more feasible choice.

Under a current technical condition, different Radio Access Technologies (RATs) work without cooperation, and a user usually selects different radio access networks by manual configuration, for example, manually selecting a Wireless Fidelity (WIFI) network or turning on a WIFI switch. Therefore, there are serious disadvantages in performance and convenience.

SUMMARY

Embodiments of the disclosure provide a service communication method using multiple RATs, which can improve performance and convenience of the multiple RATs.

A first aspect provides a service communication method using multiple RATs, the method include that: a terminal receives network capabilities of the multiple RATs; the terminal selects at least two RATs from the multiple RATs for a service of the terminal according to the network capabilities; and the terminal performs communication of the service by using the at least two RATs.

A second aspect provides a service communication method, which may include that: a network device acquires network capabilities of multiple RATs; and the network device sends the network capabilities of the multiple RATs to a terminal to enable the terminal to select at least two RATs for a service according to the network capabilities.

A third aspect provides a terminal, which may use multiple RATs for communication and include: a receiving unit, configured to receive network capabilities of the multiple RATs; a selection unit, configured to select at least two RATs from the multiple RATs for a service of the terminal according to the network capabilities received by the receiving unit; and a communication unit, configured to perform communication of the service by using the at least two RATs selected by the selection unit.

A fourth aspect provides network device, which may include: an acquisition unit, configured to acquire network capabilities of multiple RATs; and a sending unit, configured to send the network capabilities, acquired by the acquisition unit, of the multiple RATs to a terminal to enable the terminal to select at least two RATs for a service according to the network capabilities.

In the embodiments of the disclosure, the terminal selects at least two RATs for a service, so that manual setting of a user can be avoided, and thereby performance and convenience of the multiple RATs can be improved.

BRIEF DESCRIPTION OF DRAWINGS

In order to describe the technical solutions of the embodiments of the disclosure more clearly, drawings to be used for description of the embodiments or the related art will be simply introduced below. Obviously, the drawings in the following description are merely some of the embodiments of the disclosure. Those skilled in the art may further obtain other drawings according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work fall within the scope of protection of the disclosure.

It is to be noted that in the embodiments of the disclosure, the RAT may also be called a wireless technology, including, but not limited to, Long Term Evolution (LTE) commonly known as 4th-Generation (4G), a Wireless Local Area Network (WLAN), future 5G and the like.

It is to be noted that in the embodiments of the disclosure, the terminal may be a mobile terminal, including, but not limited to, a cellular phone, a Personal Digital Assistant (PDA), a terminal device in a future 5G network and the like.

It is to be noted that in the embodiments of the disclosure, the network device may be a Base Station (BS) controller or BS server configured to manage and control multiple BSs in a centralized manner, or may be a Mobility Management Entity (MME) configured to communicate with the multiple BSs, or the like, which will not be limited in the disclosure.

It is to be noted that in the embodiments of the disclosure, both the terminal and the network device support multiple RATs. Moreover, the multiple RATs may independently use their respective software and hardware resources or share same software and hardware resources, and here, the software and hardware resources may include an antenna, a radio frequency module, a baseband module, a processor, a storage system, a user interface and the like. When the same software and hardware resources are shared, the multiple RATs may separately use or simultaneously use the same software and hardware resources.

Figure 1:
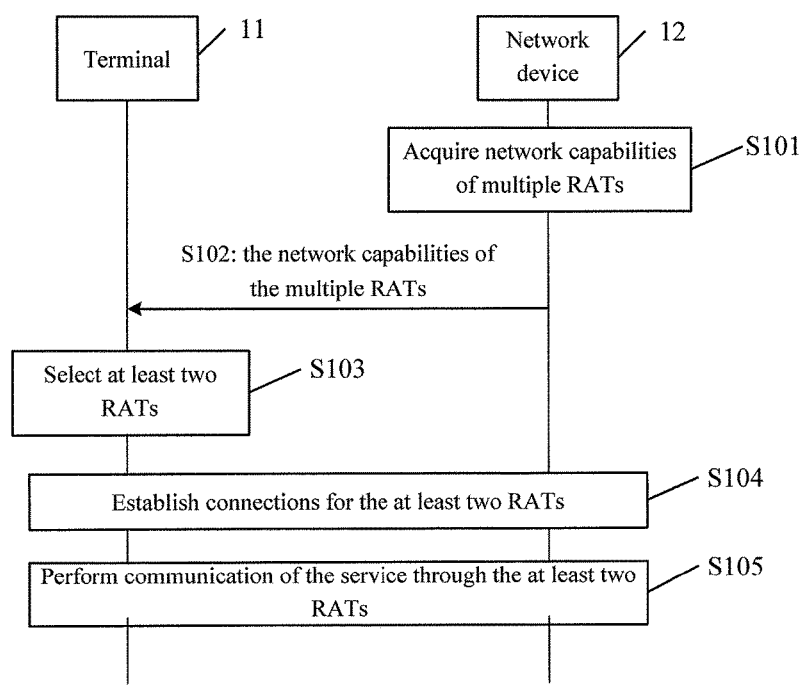
FIG. 1 illustrates a flowchart of a service communication method according to an embodiment of the disclosure.

FIG. 1 illustrates a flowchart of a service communication method according to an embodiment of the disclosure. A terminal 11 and a network device 12 are illustrated in FIG. 1. The method illustrated in FIG. 1 includes the following operations illustrated in blocks S101 to S105.

At block S101, the network device 12 acquires network capabilities of multiple RATs.

Specifically, the network device 12 may acquire the network capabilities from multiple BSs of the multiple RATs.

For example, for a RAT1 in the multiple RATs, the network device 12 may acquire the network capability of the RAT1 from multiple BSs of the RAT1.

In the embodiments of the disclosure, the network capability may include one or more of the following: a peak rate, delay time, coverage, system load, an average throughput and the like.

Herein, the coverage may be related to an intensity and quality of a transmitted signal of the BS, or may be related to a receiving sensitivity of the BS. For example, a region, in which an intensity of a transmitted signal of a BS1 which can be received is higher than a fixed value, may be determined as coverage of the BS1. Herein, the peak rate, the delay time (also called a transmission time delay) and the average throughput may be collectively called a transmission capability. Herein, the system load may also be called network load. The disclosure is not limited thereto.

In addition, the network capability may further include a supported Type of Service (ToS). Generally, the ToS may be a real-time service or a non-real-time service. For example, the real-time service may be bilateral and multilateral voice/video communications and conferences, interactive online games, intelligent transportation and the like. The non-real-time service may be file transmission, video watching and the like.

At block S102, the network device 12 sends the network capabilities of the multiple RATs to the terminal 11.

Specifically, the network device 12 may send a broadcast message, and the broadcast message may include the network capabilities of the multiple RATs. That is, the network device may send the network capabilities of the multiple RATs in a broadcast form.

Here, the multiple RATs may be all RATs in a region in which the network device 12 is located.

It can be understood that at block S102, the network device 12 broadcasts network capabilities of various RATs in the region in which it is located.

Alternatively, the network device 12 may send the network capabilities of the multiple RATs in a broadcast message, and for example, may send them on an independent signaling carrier frequency. Or, the network device 12 may send the network capabilities of the multiple RATs in respective broadcast messages.

Alternatively, in an embodiment, blocks S101 and S102 in FIG. 1 may be replaced with the following block S101' (not illustrated in FIG. 1).

At block S101', multiple BSs corresponding to multiple RATs send network capabilities of respective RATs to the terminal 11 respectively.

For example, the network capabilities may be sent in the broadcast form.

For example, for an RAT2 in the multiple RATs, multiple BSs of the RAT2 send the network capability of the RAT2 in a broadcast manner.

For example, the network device 12 (such as a BS controller or a BS server or an MME) may instruct the multiple BSs to perform sending respectively. That is, the multiple BSs may send broadcast messages respectively, and the broadcast message sent by each BS may include the network capability of the corresponding RAT.

Moreover, broadcast messages of adjacent regions may be separated in time or frequency or two-dimensional time-frequency distribution, so that a terminal located at boundaries of the regions may receive the broadcast messages of multiple regions.

In such a manner, after blocks S101 and S102 or after block S101', i.e., after receiving network capabilities of multiple RATs, the terminal 11 may learn about information about a type of a RAT supported by a peripheral network of the terminal 11 and the like.

At block S103, the terminal 11 selects at least two RATs from the multiple RATs for a service of the terminal 11.

Specifically, the terminal 11 may select the at least two RATs from the multiple RATs according to the received network capabilities of the multiple RATs.

Here, the service may be a service to be started in the terminal 11, that is, block S103 may be executed when the terminal 11 is about to initiate the service.

It can be understood that the terminal 11 may include multiple services, and in this case, the terminal 11 executes a selection process of block S103 for each service.

Specifically, the terminal 11 may select the at least two RATs according to the network capabilities, a service requirement of the service, a characteristic of the terminal 11 and a network condition of the terminal 11.

For example, the terminal 11 may select a cellular network (2nd-Generation (2G), 3rd-Generation (3G), LTE and the like) with continuous coverage and perfect mobility for a voice and/or video communication service and an interactive online game service which is not wanted to be interrupted. If the terminal 11 is located within coverage of a high-speed WLAN hotspot, a high-speed WLAN may be selected for a service of a large-volume data transmission type such as video playing and file uploading and downloading; and if the terminal 11 leaves coverage of the high-speed WLAN in a movement, the service of large-volume data transmission type may be suspended until the terminal 11 enters coverage of a high-speed WLAN again.

If the terminal 11 is in a non-stationary state, that is, the terminal 11 is in a moving state, the terminal 11 may select at least two RATs in consideration of changes of the network capabilities. That is, if the terminal 11 is in the moving state, the terminal 11 may select at least two RATs according to the network capabilities, the service requirement of the service, the characteristic of the terminal 11, the network condition of the terminal 11 and a change state of the network condition.

Herein, the service requirement of the service may include one or more of the following: data volume of the service, ToS of the service, reliability requirement of the service, real-time requirement of the service, Quality of Service (QoS) requirement of the service and the like. The ToS may be voice, video, downloading, online game, online navigation, browsing, instant message and the like.

Herein, the characteristic of the terminal 11 may include one or more of the following: occupancy rate of a Central Processing Unit(s) (CPU(s)) of the terminal, occupancy rate of a memory(s), consumption speed of the battery, remaining electric quantity of the battery, temperature of the terminal, user preference setting and the like.

It can be understood that the terminal 11 includes a processor, a memory and the like, and the processor may be the CPU. The occupancy rate may be represented as a percentage. For example, the occupancy rate of the CPU may be 1%, and the occupancy of the memory may be 12%. The remaining electric quantity of the battery may also be represented as a percentage. For example, the remaining capacity of the battery may be 50%. The consumption speed of the battery may be represented as an electric quantity percentage consumed within a unit time. For example, the consumption speed of the battery may be 10%/h, and h represents hour. The temperature of the terminal may be represented by a temperature of the CPU. The user preference setting may be preset by a user (which may be manually set), and may be an upper limit of the number of RATs used for the service communication. For example, the user preference setting may be a high-performance mode, an energy-saving mode or the like, or, the user preference setting may be an upper limit 4 of the number of RATs used for a service A.

Herein, the network condition of the terminal 11 may include one or more of the following: intensities and quality of transmitted signals, which can be received by the terminal 11, of the BSs of the multiple RATs, maximum transmitting power and antenna gains of the multiple RATs of the terminal 11, receiving sensitivities of the multiple RATs of the terminal 11, transmission capabilities of the terminal 11 in terms of the multiple RATs and the like.

Herein, the transmission capabilities of the terminal in terms of the multiple RATs may include peak rates, average throughput, transmission delays and the like.

Herein, if the terminal 11 is in a non-stationary state, the change of the network condition of the terminal 11 may be related to a change of a distance between the terminal 11 and target device and/or a movement speed of the terminal 11.

Then, it can be understood that before block S103, the method may include that: the terminal 11 calculates the network condition of the terminal 11, and alternatively, the terminal 11 may notify the network device 12 of the network condition of the terminal 11.

Specifically, the terminal 11 may acquire location information of the terminal 11 from the network device 12 and then calculate the network condition according to the location information.

For example, the network device 12 may pre-store or acquire at any time, locations of the multiple BSs corresponding to the multiple RATs. The multiple BSs may calculate distances between the terminal 11 and the multiple BSs and send distance information to the network device 12.

Then, after acquiring the information of the distances between the terminal 11 and the multiple BSs from the multiple BSs corresponding to the multiple RATs, the network device 12 may perform joint positioning according to the distance information and the locations of the multiple BSs, thereby determining the location information of the terminal.

For example, the terminal 11 or the network device 12 may combine the distance information sent by the multiple BSs to obtain an accurate result of the location of the terminal 11.

On another aspect, if the terminal 11 is in the non-stationary state, that is, the terminal 11 is in the moving state, before block S103, the method may further include that: the terminal 11 records the movement speed of the terminal 11 and notifies the network device 12 of the movement speed, or the network device 12 actively detects the movement speed of the terminal 11. Then, the network device 12 may estimate a possible movement trajectory of the terminal 11 by virtue of information such as a coverage map according to the location information and movement speed of the terminal 11, and further notify the terminal 11 according to the possible movement trajectory.

Figure 2:
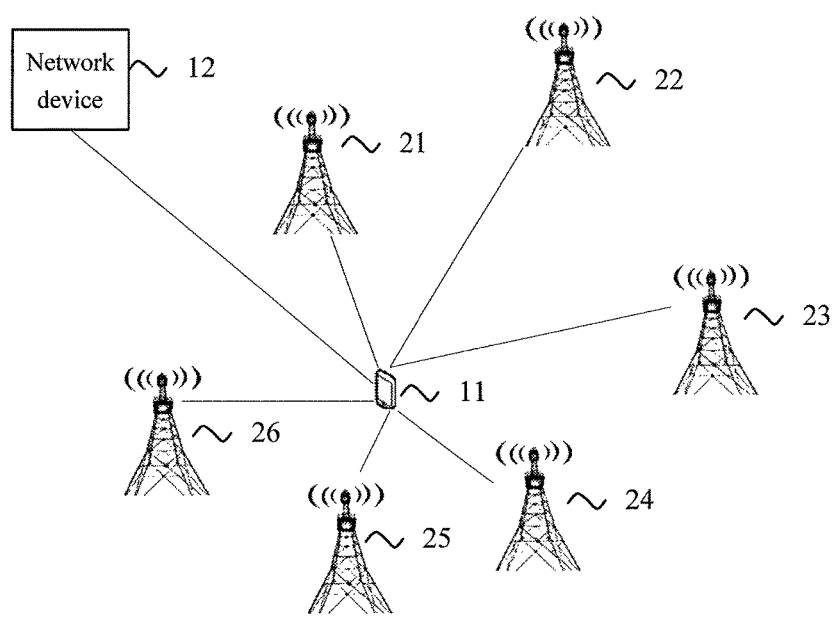
FIG. 2 illustrates a schematic diagram of a scenario according to the disclosure.

For example, as illustrated in FIG. 2, a terminal 11, network device 12 and BSs 21 to 26 of multiple RATs (supposed to be three RATs) are illustrated. The terminal 11 may determine change conditions of network capabilities of the multiple RATs, in connection with a movement condition of the terminal 11, for example, change conditions of transmitted signals of the BSs of various RATs, according to the network capabilities received from the network device 12 at block S102 or the network capabilities received from the multiple BSs at block S101', and thereby select at least two RATs.

For example, if the intensities of the transmitted signals, received by the terminal 11, of each BS of a first RAT are all higher than a first preset signal threshold value, the terminal 11 may select the first RAT. If the transmitted signals, received by the terminal 11, of the BSs of a second RAT are lower than a second preset signal threshold value, but the terminal 11 determines that the terminal 11 is approaching to a certain BS of the second RAT, the terminal 11 may also select the second RAT.

It can be understood that the first signal threshold value is related to an attribute of the first RAT and the second signal threshold value is related to an attribute of the second RAT.

Alternatively, in an embodiment, the terminal 11 may make statistics on energy consumption rates of the multiple RATs and thereby select the at least two RATs from the multiple RATs according to the network capabilities and the energy consumption rates.

Specifically, the terminal 11 may select the at least two RATs for the service, in connection with the above mentioned characteristic of the terminal, network condition of the terminal, service requirement and the like, according to the network capabilities and the energy consumption rates.

Here, the energy consumption rate may include: energy consumption rate at radio frequency and intermediate frequency and energy consumption rate by digital signal processing. The energy consumption rate may be represented as energy consumption of a unit bit, for example, a joule/bit, where a radio frequency and intermediate frequency device is, for example, a power amplifier, a filter, a mixer, an oscillator and a radio frequency/intermediate frequency switch. A digital signal processing device is, for example, a calculation unit, a storage unit and an Input/Output (I/O) unit.

It is to be noted that a manner for selecting the at least two RATs by the terminal at block S103 is not limited in the embodiment of the disclosure.

At block S104, connections are established for the at least two RATs.

Alternatively, after block S103, the terminal 11 autonomously establishes the connections for the at least two RATs, and notifies at least two BSs corresponding to the at least two RATs after establishing the connections.

Alternatively, after block S103, the terminal 11 may send an establishment request message to each of the at least two BSs corresponding to the at least two RATs, to enable the at least two BSs to establish the connections.

That is, the connection process at block S104 may be autonomously sent and executed by the terminal, or may be executed by the BSs after the terminal 11 notifies the BSs, which will not be limited in the disclosure.

It is to be noted that the terminal 11 and the network device 12, after the connection, may select a proper transmitting/receiving frequency, transmitting/receiving time and transmitting power for each RAT in the at least two RATs to avoid mutual interference of different RATs.

At block S105, the terminal 11 performs communication of the service by using the at least two RATs.

Specifically, the terminal 11 may perform communication of the service in a diversity mode and/or an aggregation mode through the at least two RATs.

Herein, the diversity mode means that communication of same content is performed by using different RATs. For example, a data packet D1 is communicated by using the first RAT and the second RAT respectively, that is, the data packet D1 is communicated in the diversity mode by using the first RAT and the second RAT. In such a manner, service communication reliability can be improved.

The aggregation mode means that communication of different contents is performed by using different RATs. For example, the data packet D1 is communicated by using the first RAT and a data packet D2 is communicated by using the second RAT, that is, communication is performed in the aggregation mode of the first RAT and the second RAT. In such a manner, the service communication rate can be increased.

A mixed mode of the diversity mode and the aggregation mode means that communication of part of data packets of the service is performed in the diversity mode by using several RATs, and communication of some data packets of the service is performed in the aggregation mode by using several RATs respectively. For example, if the first RAT is used to perform communication of the data packet D1 and the data packet D2, the second RAT is used to perform communication of the data packet D1 and a third RAT is used to perform communication of a data packet D3, it is indicated that communication of the data packet D1 is performed in the diversity mode by using the first RAT and the second RAT, and communication of the data packet D2 and the data packet D3 is performed in the aggregation mode by using the first RAT and the second RAT respectively.

In a service communication process of block S105, the terminal 11 may monitor change conditions of various parameters at any time and correspondingly adjust the multiple RATs according to the change conditions. In such a manner, service communication quality and transmission efficiency can be ensured.

As an example, if the remaining electric quantity of the battery of the terminal 11 is lower than a battery threshold value (for example, 10%), or the consumption speed of the battery is higher than a speed threshold value (for example, 30%/h), at this time, the terminal 11 may be switched to use a low-energy-consumption RAT, or the terminal 11 may reduce the number of the used RATs. That is, the terminal 11 may be disconnected from a high-energy-consumption RAT in the at least two RATs and perform communication of the service only by using the low-energy-consumption RAT in the at least two RATs, or the terminal 11 may reselect a low-energy-consumption RAT and establish a connection therewith for service communication.

In the service communication process of block S105, the terminal 11 may detect states of the at least two RATs at any time (regularly or periodically). As an example, if the intensities or quality of the signals of certain one or more RATs in the at least two RATs is too low for reasons of movement and the like of the terminal 11, a disconnection operation may be executed.

For example, if the intensities of the signals, received by the terminal 11, of all the BSs of the first RAT are lower than a first preset threshold value due to movement of the terminal 11, the first RAT is disconnected. Here, the disconnection may be actively performed by the terminal 11, or the disconnection may be performed by the BS of the first RAT after the terminal 11 sends a disconnection request message to the BS of the first RAT.

It is to be noted that, in the embodiment of the disclosure, the terminal 11 should keep one or more RATs available for an active service under network coverage.

For example, in the service communication process of block S105, if certain one or more RATs in N RATs are disconnected, causing the number of the RATs for service communication smaller than a preset threshold value (for example, 3), the terminal 11 may continue executing the processes of blocks S103 and S104 for the active service.

Specifically, when an RAT is reselected in the service communication process, the terminal 11 may consider a change condition of the service in the transmission process, besides factors illustrated in S103. For example, the change condition may include a change condition of the distance between the terminal 11 and the target device of the service, a remaining data volume of the service and the like.

Alternatively, in the embodiment of the disclosure, if none of the RATs can meet the QoS requirement of the service, the terminal 11 may send alarm information to a user, for example, presenting a specific error code on a user interface of the terminal 11, to enable the user to select to terminate the service or lower the QoS requirement of the service according to the alarm information.

Or, if none of the RATs can meet the QoS requirement of the service, the terminal 11 may terminate the service and send error information to the user, for example, presenting specific information on the user interface of the terminal 11, to enable the user to learn about that the service has been terminated. In such a manner, the user may retry communication of the service later when a network state is better.

Alternatively, in the embodiment of the disclosure, after S105, that is, after service communication is ended, the terminal 11 may disconnect the at least two RATs.

It is to be noted that the service communicated in the embodiment of the disclosure not only may include a data service, but also may be control signaling and the like.

In the embodiment of the disclosure, the terminal 11 selects at least two RATs for the service, so that manual setting of the user may be avoided, and performance and convenience of the multiple RATs can be improved. Moreover, in the service communication process, the terminal 11 detects the states of the at least two RATs, so that communication of the service can be ensured.

Figure 3:
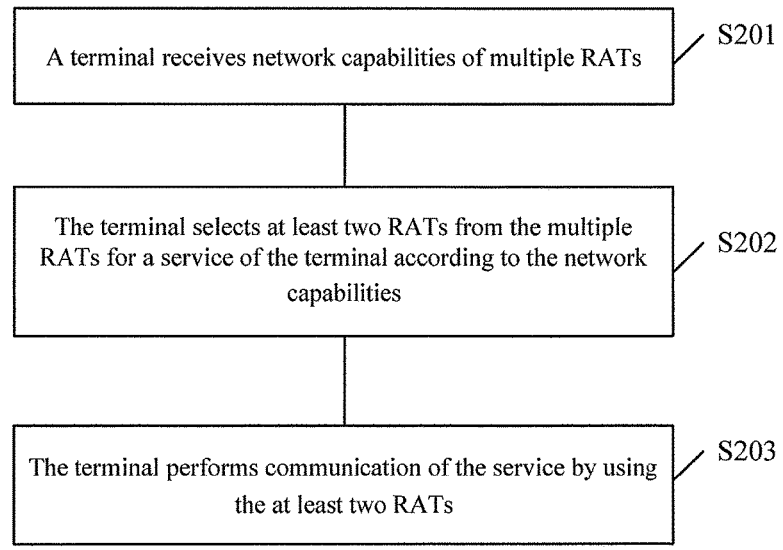
FIG. 3 illustrates a flowchart of a service communication method according to another embodiment of the disclosure.

FIG. 3 illustrates a flowchart of a service communication method according to another embodiment of the disclosure. The method illustrated in FIG. 3 includes the following operations illustrated in blocks S201 to S 203.

At block S201, a terminal receives network capabilities of multiple RATs.

At block S202, the terminal selects at least two RATs from the multiple RATs for a service of the terminal according to the network capabilities.

At block S203, the terminal performs communication of the service by using the at least two RATs.

In the embodiment of the disclosure, the terminal selects the at least two RATs for the service, so that manual setting of a user can be avoided, and performance and convenience of the multiple RATs can be improved.

Alternatively, the multiple RATs may be sent by network device, and block S201 may include that: a broadcast message sent by the network device is received, the broadcast message including the network capabilities of the multiple RATs.

Or, block S201 may include that: the network capabilities, broadcast and sent by BSs of each RAT, of the corresponding RATs are received.

Herein, the network capability may include at least one of peak rate, delay time, coverage, system load and average throughput.

Block S201 in FIG. 3 may be seen from description of block S102 or S101' in the embodiment illustrated in FIG. 1, and will not be elaborated herein to avoid repetition.

Alternatively, block S202 may include that: at least two RATs are selected for the service according to at least one of the network capabilities, a service requirement of the service, a characteristic of the terminal and a network condition of the terminal.

Herein, the network condition of the terminal may be calculated by the terminal. For example, before block S202, the terminal may acquire location information of the terminal from the network device, and then the terminal calculates the network condition according to the location information.

Alternatively, if the terminal is in a moving state, block S202 may include that: the at least two RATs are selected for the service according to at least one of the network capabilities, the service requirement of the service, the characteristic of the terminal, the network condition of the terminal and a change state of the network condition.

Herein, the network condition of the terminal and the change state of the network condition may be calculated by the terminal. For example, before block S202, the terminal may acquire the location information of the terminal and a predicted route of the location information from the network device, and then the terminal calculates the network condition according to the location information and a change of the location information, and predicts the change state of the network condition.

Here, the network condition includes at least one of the following: intensities and quality of transmitted signals, received by the terminal, of the BSs of the multiple RATs, maximum transmitting power and antenna gains of the multiple RATs of the terminal, receiving sensitivities of the multiple RATs of the terminal, transmission capabilities of the terminal in terms of the multiple RATs and the like.

Here, the service requirement includes at least one of the following: data volume of the service, ToS of the service, reliability requirement of the service, real-time requirement of the service and QoS requirement of the service.

Here, the characteristic of the terminal includes at least one of the following: occupancy rate of a CPU of the terminal, occupancy rate of a memory of the terminal, consumption speed of the battery of the terminal, remaining electric quantity of the battery of the terminal, temperature of the terminal and user preference setting.

Alternatively, block S202 may include that: statistics on energy consumption rates of the multiple RATs are made; and the at least two RATs are selected from the multiple RATs according to the network capabilities and the energy consumption rates. Herein, the energy consumption rate includes energy consumption rate at radio frequency and intermediate frequency and energy consumption rate by digital signal processing.

Block S202 in FIG. 3 may be seen from description of block S103 in the embodiment illustrated in FIG. 1, and will not be elaborated herein to avoid repetition.

Before block S203, the method may further include that: connections are established for the at least two RATs. For example, the terminal may autonomously establish the connections for the at least two RATs. Or, the terminal may send an establishment request message to at least two BSs corresponding to the at least two RATs to enable the at least two BSs to establish the connections. That is, a connection establishment process may be executed by the terminal or the BSs, which will not be limited in the disclosure. Specifically, the connection establishment process may be seen from descriptions of S104 in the embodiment illustrated in FIG. 1.

In addition, before block S203, the method may further include that: proper transmitting/receiving frequencies, transmitting/receiving time and transmitting power may be selected for the at least two RATs respectively. For example, such a selection process may be executed by the terminal or the network device, so that mutual interference of the multiple RATs can be avoided.

In the embodiment of the disclosure, during service communication, for the at least two RATs, a diversity mode and/or an aggregation mode may be used. That is, block S203 may include that: communication of the service is performed in the diversity mode and/or the aggregation mode through the at least two RATs, where the diversity mode means that communication of same content is performed by using different RATs in the at least two RATs, and the aggregation mode means that communication of different contents is performed by using different RATs in the at least two RATs.

Block S203 in FIG. 3 may be seen from description of block S105 in the embodiment illustrated in FIG. 1, and will not be elaborated herein to avoid repetition.

Furthermore, after block S203, that is, after service communication is ended, the at least two RATs may be disconnected. In such a manner, unnecessary resource occupation can be avoided, so that resource utilization can be improved.

In the embodiment of the disclosure, the terminal selects at least two RATs for the service, so that manual setting of the user can be avoided, and the performance and convenience of the multiple RATs can be improved.

Figure 4:
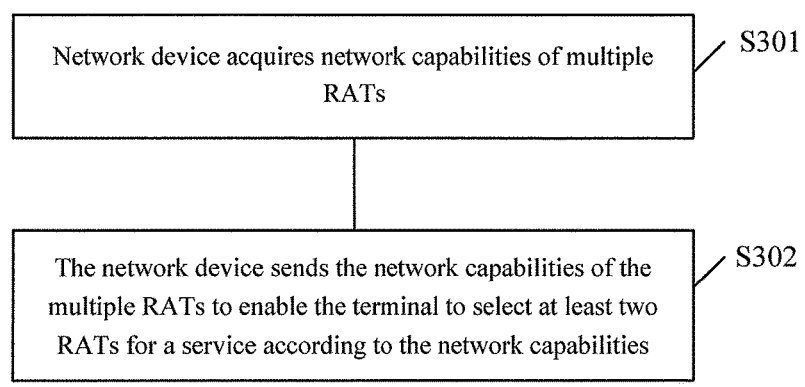
FIG. 4 illustrates a flowchart of a service communication method according to another embodiment of the disclosure.

FIG. 4 illustrates a flowchart of a service communication method according to another embodiment of the disclosure. The method illustrated in FIG. 4 includes the following operations illustrated in blocks S301 to S302.

At block S301, a network device acquires network capabilities of multiple RATs.

At block S302, the network device sends the network capabilities of the multiple RATs to a terminal to enable the terminal to select at least two RATs for a service according to the network capabilities.

In the embodiment of the disclosure, the network device may provide the network capabilities of the multiple RATs for the terminal, such that the terminal may select the at least two RATs from the multiple RATs for service communication, so that manual setting of a user can be avoided, and thereby performance and convenience of the multiple RATs can be improved.

Alternatively, in S301, the network device may acquire the network capabilities of the multiple RATs from BSs of the multiple RATs. The network capability may include at least one of the following: peak rate, delay time, coverage, system load and average throughput.

Alternatively, the network device may further calculate and determine location information of the terminal and the like.

In the embodiment of the disclosure, block S301 may be seen from description of block S101 in the embodiment illustrated in FIG. 1, block S302 may be seen from description of S102 in the embodiment illustrated in FIG. 1, and they will not be elaborated herein to avoid repetition.

In addition, the network device may further notify the location information of the terminal to the terminal, and in such a manner, the terminal may determine a network condition of the terminal on the basis of the location information.

Herein, a change of the network condition of the terminal may be related to a change of a distance between the terminal and target device and/or a movement speed of the terminal.

Herein, the network condition includes at least one of: intensities and quality of transmitted signals, received by the terminal, of the BSs of the multiple RATs, maximum transmitting power and antenna gains of the multiple RATs of the terminal, receiving sensitivities of the multiple RATs of the terminal and transmission capabilities of the terminal in terms of the multiple RATs.

Figure 5:
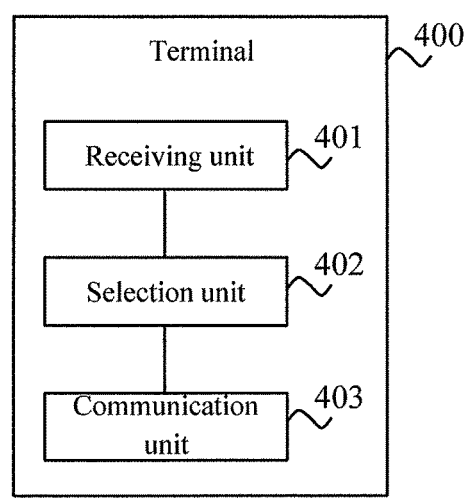
FIG. 5 illustrates a structure block diagram of a terminal according to an embodiment of the disclosure.

FIG. 5 illustrates a structure block diagram of a terminal according to an embodiment of the disclosure. The terminal 400 illustrated in FIG. 5 may adopt multiple RATs for communication, and includes a receiving unit 401, a selection unit 402 and a communication unit 403.

The receiving unit 401 is configured to receive network capabilities of the multiple RATs.

The selection unit 402 is configured to select at least two RATs from the multiple RATs for a service of the terminal according to the network capabilities received by the receiving unit 401.

The communication unit 403 is configured to perform communication of the service by using the at least two RATs selected by the selection unit 402.

In the embodiment of the disclosure, the terminal selects at least two RATs for the service, so that manual setting of a user can be avoided, and thereby performance and convenience of the multiple RATs can be improved.

Alternatively, in an embodiment, the multiple RATs are sent by the network device, and the receiving unit 401 may specifically be configured to receive a broadcast message sent by the network device, the broadcast message including the network capabilities of the multiple RATs. Or, the receiving unit 401 may specifically be configured to receive the network capabilities, broadcast by BSs of each RAT, of the corresponding RATs.

Herein, the network capability includes at least one of the following: peak rate, delay time, coverage, system load and average throughput.

Alternatively, in another embodiment, the selection unit 402 may specifically be configured to select the at least two RATs for the service according to at least one of the network capabilities, a service requirement of the service, a characteristic of the terminal and a network condition of the terminal.

Alternatively, in another embodiment, if the terminal 400 is in a moving state, the selection unit 402 may specifically be configured to select the at least two RATs for the service according to at least one of the network capabilities, the service requirement of the service, the characteristic of the terminal, the network condition of the terminal and a change state of the network condition.

Herein, the network condition may include at least one of the following: intensities and quality of transmitted signals, received by the terminal, of the BSs of the multiple RATs, maximum transmitting power and antenna gains of the multiple RATs of the terminal, receiving sensitivities of the multiple RATs of the terminal and transmission capabilities of the terminal in terms of the multiple RATs.

Herein, the service requirement may include at least one of the following: data volume of the service, ToS of the service, reliability requirement of the service, real-time requirement of the service and QoS requirement of the service.

Herein, the characteristic of the terminal may include at least one of the following: occupancy rate of a CPU of the terminal, occupancy rate of a memory of the terminal, consumption speed of the battery of the terminal, remaining electric quantity of the battery of the terminal, temperature of the terminal and user preference setting.

Alternatively, in another embodiment, the selection unit 402 may specifically be configured to make statistics on energy consumption rates of the multiple RATs, and select the at least two RATs from the multiple RATs according to the network capabilities and the energy consumption rates. The energy consumption rate includes energy consumption rate at radio frequency and intermediate frequency and energy consumption rate by digital signal processing.

Alternatively, in another embodiment, the communication unit 403 may further be configured to establish connections for the at least two RATs. Or, the communication unit 403 may further be configured to send an establishment request message to at least two BSs corresponding to the at least two RATs to enable the at least two BSs to establish the connections.

Alternatively, in another embodiment, the selection unit 402 may further be configured to select proper transmitting/receiving frequencies, transmitting/receiving time and transmitting power for the at least two RATs.

Alternatively, in another embodiment, the communication unit 403 may specifically be configured to perform communication of the service in a diversity mode and/or an aggregation mode through the at least two RATs. Herein, the diversity mode means that communication of same content is performed by using different RATs in the at least two RATs, and the aggregation mode means that communication of different contents is performed by using different RATs in the at least two RATs.

Alternatively, in another embodiment, the terminal 400 may further include a disconnection unit, configured to disconnect the at least two RATs after service communication is ended.

Figure 6:
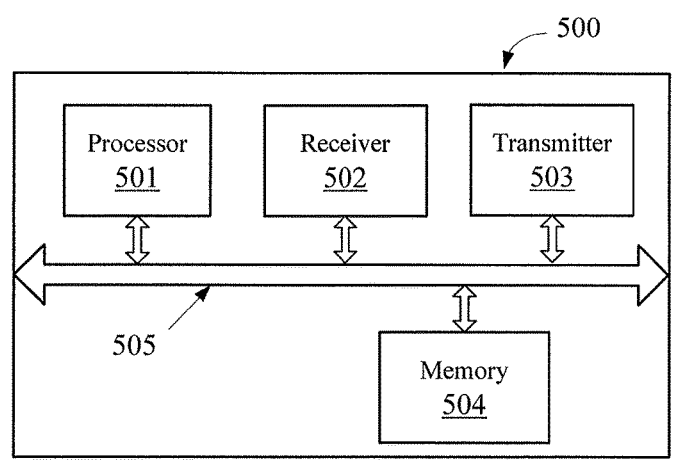
FIG. 6 illustrates a structure block diagram of a terminal according to another embodiment of the disclosure.

It is to be noted that, in the embodiment of the disclosure, the receiving unit 401 may be implemented by a receiver, the communication unit 403 may be implemented by a transmitter, and the selection unit 402 and the disconnection unit may be implemented by a processor. As illustrated in FIG. 6, a terminal 500 may include a processor 501, a receiver 502, a transmitter 503 and a memory 504. The memory 504 may be configured to store codes executed by the processor 501 and the like.

Each component of the terminal 500 is coupled together through a bus system 505, which includes a data bus, and further includes a power bus, a control bus and a state signal bus.

The terminal 400 illustrated in FIG. 5 or the terminal 500 illustrated in FIG. 6 may implement each process implemented by the terminal in the embodiments illustrated in FIG. 1 to FIG. 4, which will not be elaborated herein to avoid repetition.

Figure 7:
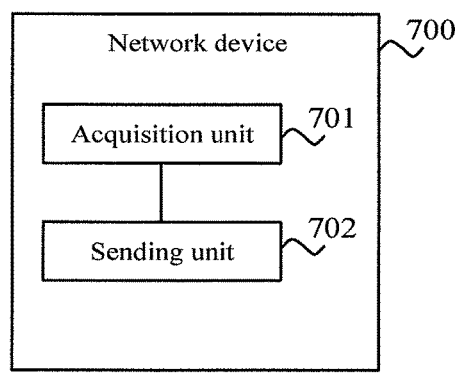
FIG. 7 illustrates a structure block diagram of a network device according to an embodiment of the disclosure.

FIG. 7 illustrates a structure block diagram of network device according to an embodiment of the disclosure. The network device 700 illustrated in FIG. 7 includes an acquisition unit 701 and a sending unit 702.

The acquisition unit 701 is configured to acquire network capabilities of multiple RATs.

The sending unit 702 is configured to send the network capabilities, acquired by the acquisition unit 701, of the multiple RATs to a terminal to enable the terminal to select at least two RATs for a service according to the network capabilities.

In the embodiment of the disclosure, the network device may provide the network capabilities of the multiple RATs for the terminal, such that the terminal can select at least two RATs from the multiple RATs for service communication, so that manual setting of a user can be avoided, and thereby performance and convenience of the multiple RATs can be improved.

Alternatively, in an embodiment, the acquisition unit 701 is specifically configured to: acquire the network capabilities of the corresponding RATs from BSs of the multiple RATs. The network capability includes at least one of peak rate, delay time, coverage, system load and average throughput.

Alternatively, in another embodiment, the sending unit 702 is specifically configured to send the network capabilities to the terminal in a broadcast form.

Alternatively, in another embodiment, the sending unit 702 is further configured to send location information of the terminal to the terminal to enable the terminal to determine a network condition of the terminal according to the location information.

Herein, the network condition includes at least one of the following: intensities and quality of transmitted signals, received by the terminal, of the BSs of the multiple RATs, maximum transmitting power and antenna gains of the multiple RATs of the terminal, receiving sensitivities of the multiple RATs of the terminal and transmission capabilities of the terminal in terms of the multiple RATs.

Figure 8:
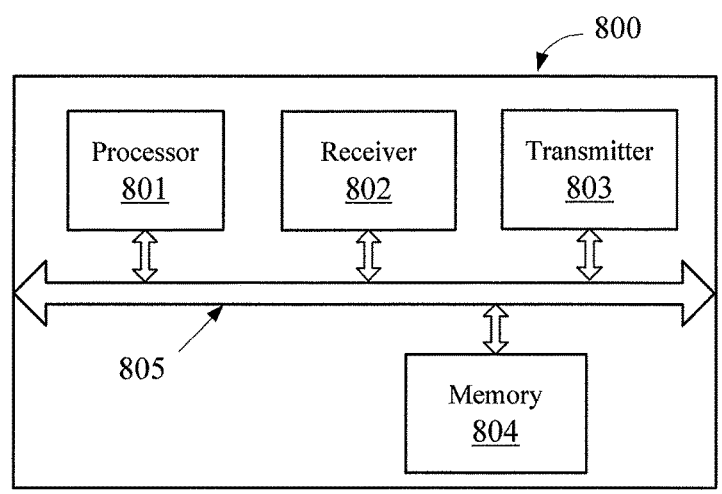
FIG. 8 illustrates a structure block diagram of a network device according to another embodiment of the disclosure.

It is to be noted that, in the embodiment of the disclosure, the acquisition unit 701 is implemented by a receiver, and the sending unit 702 is implemented by a transmitter. As illustrated in FIG. 8, network device 800 may include a processor 801, a receiver 802, a transmitter 803 and a memory 804. The processor 801 is configured to calculate a network condition of the terminal and the like, and the memory 804 is configured to store codes executed by the processor 801 and the like.

The components of the network device 800 are coupled together through a bus system 805, which includes a data bus, and further includes a power bus, a control bus and a state signal bus.

The network device 700 illustrated in FIG. 7 or the network device 800 illustrated in FIG. 8 may implement each process implemented by the network device in the embodiments illustrated in FIG. 1 to FIG. 4, which will not be elaborated herein to avoid repetition.

Those skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment for convenient and brief description and will not be elaborated herein.

In some embodiments provided by the disclosure, it can be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A service communication method, in which multiple Radio Access Technologies (RATs) are used, the method comprising:

receiving, by a terminal, network capabilities of the multiple RATs;

acquiring, by the terminal, location information of the terminal and a predicted route of the location information from a network device, and calculating, by the terminal, a network condition according to the location information and a change of the location information, and predicting, by the terminal, a change state of the network condition according to the predicted route of the location information of the terminal;

selecting, by the terminal, at least two RATs from the multiple RATs for a service of the terminal according to the network capabilities; and performing, by the terminal, communication of the service by using the at least two RATs, wherein when the terminal is in a moving state, the selecting at least two RATs from the multiple RATs for a service of the terminal according to the network capabilities comprises:

selecting the at least two RATs for the service according to the network capabilities, a service requirement of the service, a characteristic of the terminal, the network condition of the terminal and the change state of the network condition;

wherein the selecting at least two RATs from the multiple RATs for a service of the terminal according to the network capabilities comprises:

making statistics on energy consumption rates of the multiple RATs; and selecting the at least two RATs from the multiple RATs according to the network capabilities and the energy consumption rates;

wherein the energy consumption rate comprises: energy consumption rate at radio frequency and intermediate frequency and energy consumption rate by digital signal processing.

2. The method according to claim 1, wherein the multiple RATs are sent by the network device, and wherein the receiving network capabilities of the multiple RATs comprises:

receiving a broadcast message sent by the network device, the broadcast message comprising the network capabilities of the multiple RATs.

3. The method according to claim 1, wherein the receiving the network capabilities of the multiple RATs comprises:

receiving the network capabilities, broadcast by Base Stations (BSs) of each of the RATs, of the corresponding RATs.

4. The method according to claim 1, wherein the network condition comprises at least one of the following:

intensities and quality of transmitted signals, received by the terminal, of the BSs of the multiple RATs, maximum transmitting power and antenna gains of the multiple RATs of the terminal, receiving sensitivities of the multiple RATs of the terminal or transmission capabilities of the terminal in terms of the multiple RATs.

5. The method according to claim 1, wherein the service requirement comprises at least one of the following:

data volume of the service, Type of Service (ToS) of the service, reliability requirement of the service or real-time requirement of the service.

6. The method according to claim 1, wherein the characteristic of the terminal comprises at least one of the following:

occupancy rate of a Central Processing Unit (CPU) of the terminal, occupancy rate of a memory of the terminal, consumption speed of a battery of the terminal, remaining electric quantity of the battery of the terminal, temperature of the terminal or user preference setting.

7. The method according to claim 1, wherein before performing communication of the service by using the at least two RATs, the method further comprises:

establishing connections for the at least two RATs; or, sending an establishment request message to at least two BSs corresponding to the at least two RATs to enable the at least two BSs to establish the connections.

8. The method according to claim 1, wherein before performing communication of the service by using the at least two RATs, the method further comprises:

selecting proper transmitting and receiving frequencies, transmitting and receiving time and transmitting powers for the at least two RATs respectively.

9. The method according to claim 1, wherein the performing communication of the service by using the at least two RATs comprises:

performing communication of the service in at least one of a diversity mode or an aggregation mode through the at least two RATs, wherein the diversity mode means that communication of same content is performed by using different RATs in the at least two RATs, and the aggregation mode means that communication of different contents is performed by using different RATs in the at least two RATs.

10. The method according to claim 1, wherein the network capability comprises at least one of the following:

peak rate, delay time, coverage, system load and average throughput.

11. The method according to claim 1, further comprising: disconnecting the at least two RATs after communication of the service is ended.

12. The method according to claim 1, wherein the performing, by the terminal, communication of the service by using the at least two RATs comprises:

receiving, by the terminal, the service by using the at least two RATs.

13. A service communication method, comprising:

acquiring, by network device, network capabilities of multiple Radio Access Technologies (RATs); and sending, by the network device, the network capabilities of the multiple RATs to a terminal to enable the terminal to select at least two RATs for a service according to the network capabilities, wherein when the terminal is in a moving state, in order to enable the terminal to select at least two RATs for a service according to the network capabilities, the method further comprises:

selecting the at least two RATs for the service according to the network capabilities, a service requirement of the service, a characteristic of the terminal, a network condition of the terminal and a change state of the network condition, wherein the network condition is calculated according to location information of the terminal and a change of the location information, and the change state of the network condition is predicted according to a predicted route of the location information of the terminal;

wherein the selecting at least two RATs from the multiple RATs for a service of the terminal according to the network capabilities comprises:

making statistics on energy consumption rates of the multiple RATs; and selecting the at least two RATs from the multiple RATs according to the network capabilities and the energy consumption rates;

wherein the energy consumption rate comprises: energy consumption rate at radio frequency and intermediate frequency and energy consumption rate by digital signal processing.

14. The method according to claim 13, wherein the acquiring the network capabilities of the multiple RATs comprises:
acquiring, from Base Stations (BSs) of the multiple RATs, the network capabilities of the corresponding RATs.

15. The method according to claim 13, wherein the sending the network capabilities of the multiple RATs to the terminal comprises:
sending the network capabilities to the terminal in at least one of broadcast or signaling form.

16. A terminal, which uses multiple Radio Access Technologies (RATs) for communication, the terminal comprising:
a receiver, configured to receive network capabilities of the multiple RATs;
a processor, configured to select at least two RATs from the multiple RATs for a service of the terminal according to the network capabilities received by the receiving unit; and
a transmitter, configured to perform communication of the service by using the at least two RATs selected by the selection unit,
wherein the processor is further configured to: acquire a location information of the terminal and a predicted route of the location information from a network device, and calculate a network condition according to the location information and a change of the location information, and predict a change state of the network condition,
wherein when the terminal is in a moving state, in order to select at least two RATs from the multiple RATs for a service of the terminal according to the network capabilities received by the receiving unit, the processor is further configured to:
select the at least two RATs for the service according to the network capabilities, a service requirement of the service, a characteristic of the terminal, the network condition of the terminal and the change state of the network condition;
wherein the selecting at least two RATs from the multiple RATs for a service of the terminal according to the network capabilities comprises:
making statistics on energy consumption rates of the multiple RATs; and selecting the at least two RATs from the multiple RATs according to the network capabilities and the energy consumption rates;
wherein the energy consumption rate comprises: energy consumption rate at radio frequency and intermediate frequency and energy consumption rate by digital signal processing.

17. The terminal according to claim 16, wherein the multiple RATs are sent by the network device, and the receiver is configured to: receive a broadcast message sent by the network device, the broadcast message comprising the network capabilities of the multiple RATs.

18. The terminal according to claim 16, wherein the receiver is configured to: receive the network capabilities, sent by Base Stations (BSs) of more than two RATs through broadcast or signaling, of the corresponding RATs.

* * * * *